UNITED STATES PATENT OFFICE

WILLIAM B. LERCH, OF BARTLESVILLE, OKLAHOMA, ASSIGNOR, BY DIRECT AND MESNE ASSIGNMENTS, TO CURO PROCESS COMPANY, OF BARTLESVILLE, OKLAHOMA, A CORPORATION OF DELAWARE

PROCESS AND PRODUCT FOR TREATING EMULSIONS OF MINERAL OILS OR THE LIKE

No Drawing.   Application filed October 11, 1929.   Serial No. 399,098.

My invention relates to a process and product used therein having as an object more particularly the breaking up of the emulsions met with in the production and refining of petroleum products, but it may also be used to advantage in other industrial applications, such as paint manufacture, water purification etc.

One of the major problems of the petroleum industry is the useful recovery of the considerable crude petroleum content of the emulsions referred to. For several reasons these emulsions are not amenable to the usual fractional distillation processes of an oil refinery and their resolution on a commercial scale has been found to be a matter of very great difficulty. These conditions have resulted in an immense accumulation of such emulsions, taxing storage facilities and giving rise to a serious disposal problem.

My invention will be understood from the following explanations of the process used and the nature of certain substances used therein:

An ordinary mixture of oil and water may be readily separated, after a period of quiesence, because of the difference in gravity of the two liquids, but an emulsion (i. e., particles of a liquid suspended in a liquid) behaves differently, no separation by gravity is possible. The particles comprising the disperse phase are extremely minute, so that the force of gravity is counterbalanced by other forces which keep them in suspension.

To overcome and counteract the play of the sustaining forces noted, whatever their nature, electric, molecular, surface tension etc., I have discovered that treatment of petroleum, and other hydro-carbon emulsions, with certain demulsifying re-agents as described hereinafter, brings about a distinct tendency to separation between the disperse phase and the dispersion medium (water, brine, etc.) my demulsifying re-agents are the product of reacting a chlorinated fatty acid with a sulphonated hydrocarbon or a sulphonated fatty acid with a chlorinated hydrocarbon.

As a specific example, I chlorinate cottonseed oil and mix the chlorinated oil with an equal amount of a hydrocarbon material, usually of a tarry nature, and then subject the mixture to the action of sulphuric acid at a temperature of about 120° F. The reaction product is then washed with water and neutralized, preferably with ammonia. When the ammonium salt is heated to approximately 200° F. amino, lactam, and imino compounds of uncertain constitution are formed. These imino compounds are soluble in oil and are good demulsifying agents.

In the foregoing process, a number of hydrocarbon substances can be used. Blau gas tars, Pintsch gas tars, tars produced in process of cracking natural gas, or the vapor stage cracking of crude petroleum etc.

Certain coal tars, particularly those obtained by coking coals which have an appreciable alumina content in ash thereof or coals coked by processes whereby the treatment is not too high to form appreciable quantities of aromatic hydrocarbons can be used as well as other hydrocarbons containing hydrocarbons of the polyolefine, cyclopentene or cyclohexene series, such as may be formed in cracking petroleum products in the presence of clays containing alumina, such as shale tars. I prefer to select Blau gas tars as the most feasible, in view of their abundance and the economy with which they may be obtained, primarily because there is little or no commercial use for the same at present. Further, I particularly prefer to use Blau gas tar which has been produced as a by-product in the manufacture of Blau gas from mineral oil.

The above tars or raw materials are highly unsaturated hydrocarbons of the polyolefine, cyclopentene or cyclohexene series, and may be divisible into two groups, as follows:

First, the highly reactive tars having a specific gravity at sixty degrees Fahrenheit of approximately 0.905, which are readily absorbable by sulphuric acid, as for instance the cyclopentene series.

Second, the very highly reactive tars, having a specific gravity at sixty degrees Fahrenheit of approximately 0.835, as for instance those of the cyclopentadienes or methylene cyclopentanes.

By the term "highly reactive", I mean the degree of rate of absorption of the tar by sulphuric acid.

These residual tars are used in the unrefined state in which they are received as by-products of whatever manufacture produces the same. Unrefined coal gas tars are just as desirable as Blau gas tars, provided they have been produced under the conditions above mentioned. Blau gas tars are the residue or by-product obtained from the manufacture of Blau gas as outlined in Patent #862,383,— illuminating liquefied gas and method of treating distillation gases to produce the same, to Hermann Blau. The Blau gas tars may be made from such raw products as petroleum gas oils, or the destructive distillation of coal, wood, peat, vegetable or mineral oils, etc., there being practically no difference in the resulting tars, so far as desirability in a demulsifying agent is concerned, since in all instances the oils or coals, or raw materials, are decomposed and the tars formed in the presence of alumina. However, as before mentioned, I prefer to use Blau gas tar obtained as a by-product from the manufacture of Blau gas from mineral oil, on account of abundance and the economy with which it may be obtained and used.

Instead of chlorinating the cottonseed oil, the tar, or other hydrocarbon body used may be chlorinated, as a modification of the above process, the sulphuric acid being added to the cotton seed oil before admixture with the hydrocarbon ingredient. In this modification, the chlorinated hydrocarbon, such as a chlorinated tar, reacts with a sulphonated fatty oil, for example sulphonated cottonseed oil to yield demulsifying agents which I use in my demulsifying process.

The demulsifying agent, obtained as above outlined, may be added full strength to the emulsion, or it may be diluted with gasoline or other like solvent. Preferably the addition of the treating agent is accompanied by agitation, which may be accomplished by selecting a place of introduction in the producing, or refining, operations affording such agitation without the provision of special devices, but if that is not practical such devices, well known in the art may be used.

While the processes described in this specification have been found to work satisfactorily without agitation and in the cold, an increased effect in resolving certain emulsions, which differ considerably in chemical and physical characteristics, as noted above, is obtained by adding the treating compound to the heated emulsion, either with or without agitation. For small quantities of emulsions, and especially in refinery work such a modification of the general process is at times practical, and with the utilization of waste heat from still or boiler stacks.

Furthermore, while I have indicated cottonseed oil and its derivatives as a typical instance of the use of a fatty acid ingredient in making up my treating compound, it will be understood that any suitable vegetable oil, castor oil etc., capable of readily absorbing a halogen, chlorine, bromine etc. can be used instead, or halogenated derivatives of the same, prepared substantially as above explained.

Having fully described my invention what I claim is:

1. A demulsifying agent comprising the product obtained by reacting a chlorinated hydrocarbon material formed by chlorinating hydrocarbons of the polyolefine, cyclopentene or cyclohexene series with a sulphonated vegetable oil.

2. A demulsifying agent comprising the product obtained by reacting a chlorinated hydrocarbon material formed by chlorinating hydrocarbons of the polyolefine, cyclopentene or cyclohexene series with sulphonated castor oil.

3. A demulsifying agent comprising the product obtained by reacting a chlorinated hydrocarbon material formed by chlorinating hydrocarbons of the polyolefine, cyclopentene or cyclohexene series with sulphonated cottonseed oil.

4. A demulsifying agent comprising the product of reacting a tarry substance of the polyolefine, cyclopentene or cyclohexene series and a fatty acid substance, one of which substances has been chlorinated and the other sulphonated prior to reaction therebetween.

5. A demulsifying agent comprising the product of reacting a chlorinated tar, formed by chlorinating tarry material of the polyolefine, cyclopentene or cyclohexene series, with a sulphonated castor oil at about 120° F.

6. The process of resolving oil emulsions which comprises mixing therewith a demulsifying agent comprising the product of reacting a chlorinated unsaturated hydrocarbon, formed by chlorinating hydrocarbons of the polyolefine, cyclopentene and cyclohexene series, with a sulphonated vegetable oil.

7. The process of resolving oil emulsions which comprises mixing therewith a demulsifying agent comprising the product of reacting a chlorinated tarry material, formed by chlorinating tarry material of the polyolefine, cyclopentene and cyclohexene series, with sulphonated castor oil.

8. The process of resolving oil emulsions which comprises mixing therewith a demulsifying agent comprising the product of reacting a chlorinated tarry material, formed by chlorinating tarry material of the polyolefine, cyclopentene and cyclohexene series, with sulphonated cottonseed oil.

9. The process of resolving oil emulsions which comprises mixing therewith a demulsifying agent comprising the product of reacting a chlorinated tar, formed by chlorinating tarry material with a sulphonated castor oil at about 120° F.

10. The process of resolving oil emulsions which comprises mixing therewith a demulsifying agent comprising the product of reacting a chlorinated tar, formed by chlorinating tarry material with a sulphonated cottonseed oil at about 120° F.

In testimony whereof, I have signed this specification.

WILLIAM B. LERCH.